United States Patent [19]
Smith et al.

[11] Patent Number: 5,452,643
[45] Date of Patent: Sep. 26, 1995

[54] HYDRAULIC POWER DRIVE UNIT

[75] Inventors: Mark H. Smith, Vashon Island; Michael E. Renzelmann, Woodinville, both of Wash.

[73] Assignee: The Boeing Company, Seattle, Wash.

[21] Appl. No.: 45,900

[22] Filed: Apr. 12, 1993

Related U.S. Application Data

[63] Continuation-in-part of Ser. No. 828,308, Jan. 30, 1992, Pat. No. 5,201,479.

[51] Int. Cl.$^6$ ............................................. F15B 9/10
[52] U.S. Cl. ........................... 91/382; 91/410; 91/416; 91/437; 92/136; 475/83; 475/332
[58] Field of Search ................. 92/136; 91/397, 91/410, 30, 32, 398, 416, 437, 445, 447, 382; 475/83, 84, 248, 249, 329, 332

[56] References Cited

U.S. PATENT DOCUMENTS

| | | | |
|---|---|---|---|
| 2,280,809 | 4/1942 | Evans | 116/124 |
| 2,320,849 | 6/1943 | Claybourn et al. | 70/265 |
| 2,397,526 | 4/1946 | Bonbright | 244/12 |
| 2,712,421 | 7/1955 | Naumann | 244/49 |
| 2,925,233 | 2/1960 | Dunn et al. | 244/43 |
| 3,200,586 | 8/1965 | Ernest | 92/5 R |
| 3,335,739 | 8/1967 | Rice | 91/437 |
| 3,407,946 | 10/1968 | Pilch | 91/410 |
| 3,452,397 | 7/1969 | Newton | 91/416 |
| 3,541,927 | 11/1970 | Iijima | 91/437 |
| 3,738,192 | 6/1973 | Belansky | 475/249 |
| 3,806,083 | 4/1974 | Phillips et al. | 91/410 |
| 4,252,050 | 2/1981 | Barton et al. | 91/382 |
| 4,536,130 | 8/1985 | Orlando et al. | 92/5 R |
| 4,627,328 | 12/1986 | Renders | 92/410 |
| 4,778,129 | 10/1988 | Byford | 244/49 |
| 4,872,360 | 10/1989 | Lew et al. | 92/117 A |

FOREIGN PATENT DOCUMENTS

| | | | |
|---|---|---|---|
| 587158 | 10/1932 | Germany . | |
| 888367 | 8/1953 | Germany . | |
| 21002 | 2/1983 | Japan | 91/447 |

OTHER PUBLICATIONS

Stewart, H. L., "Piston–Type Rotary Actuator" in Fluid Power, (Indiana, Bobbs–Merrill Educational Publishing) pp. 318–323.

Primary Examiner—F. Daniel Lopez
Attorney, Agent, or Firm—Glenn D. Bellamy

[57] ABSTRACT

A hydraulic power drive unit (36) including a linear hydraulic piston cylinder unit (64) with a set of longitudinally spaced gear teeth (84) in the form of a rack. A pinion gear (86) is operatively engaged and driven by the rack (84). A differential which may include a carrier (102), planet gears (108, 110) and sun gears (120, 122) may be driven by the pinion gear (86) to selectively transfer drive power to two separate rotary drive outputs (38, 40). A switching valve (160) may be provided which is responsive to a reversal of hydraulic supply pressure. Operation of the switching valve (160) may be limited by mechanical interference between an inhibit dog (181) and a cam surface (196) on the carrier (102). The carrier (102) may also include a separate cam surface (140) positioned for actuation of separate electrical switches (146, 148) in order to monitor position of the drive outputs (38, 40).

4 Claims, 13 Drawing Sheets

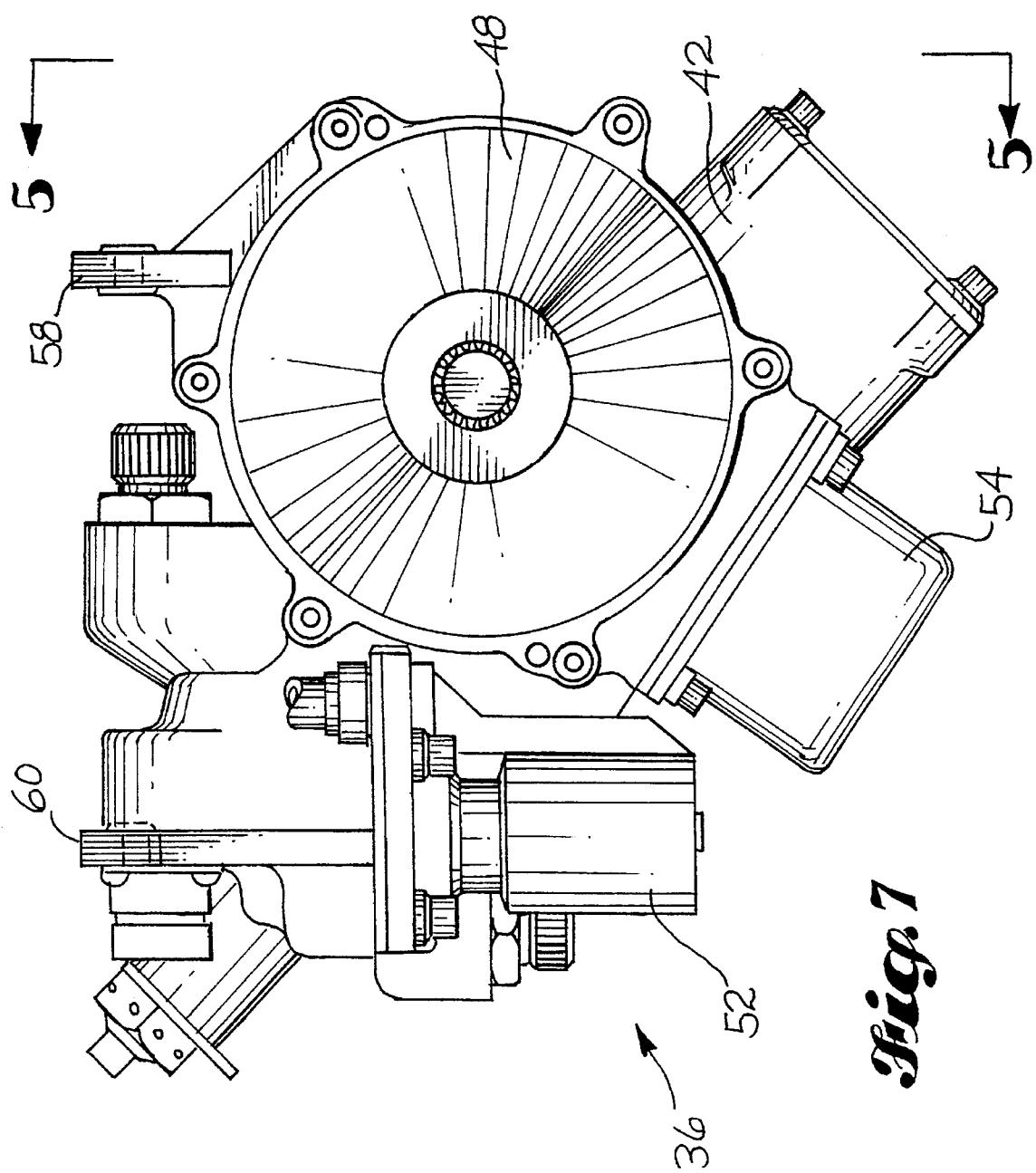

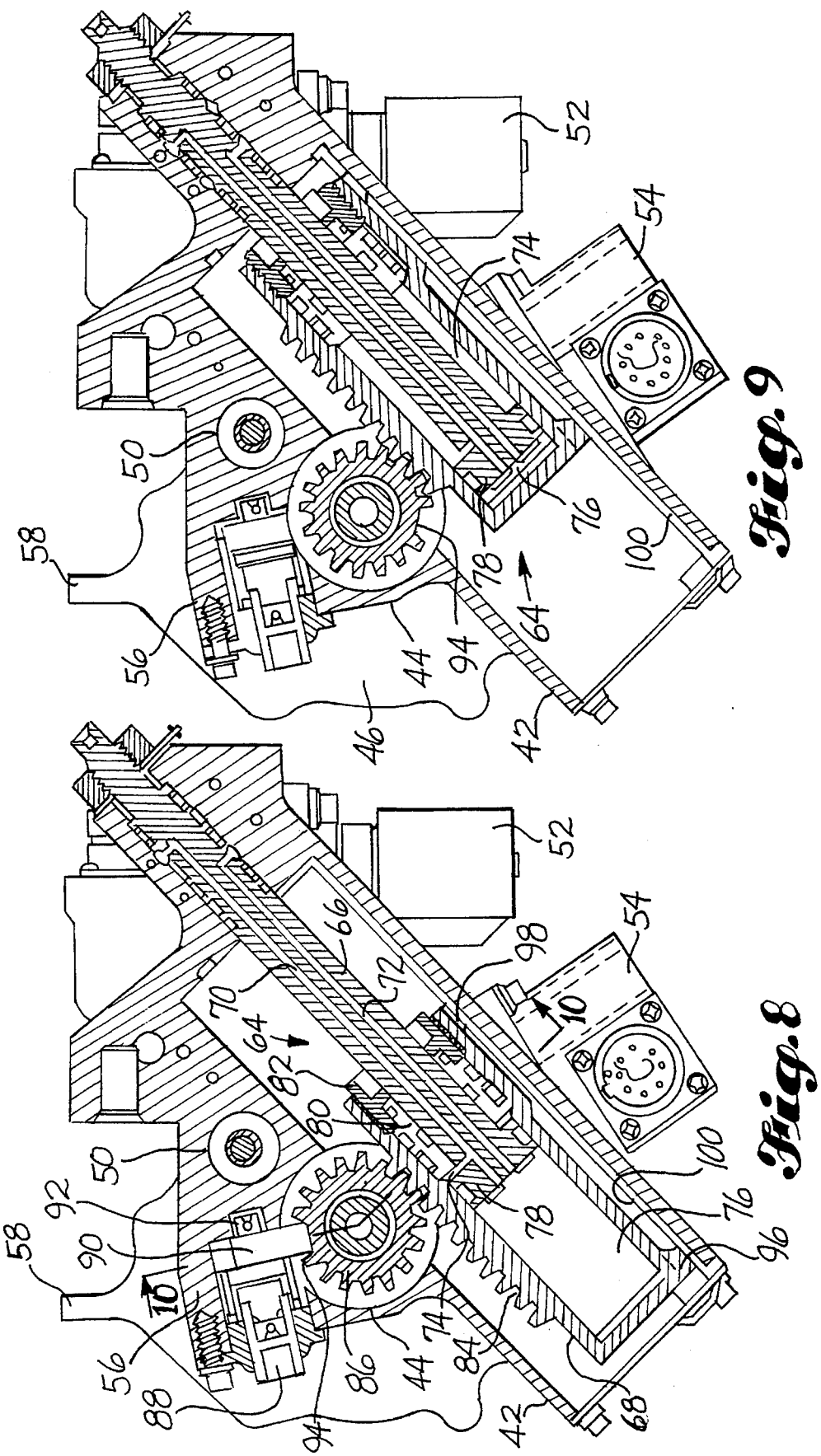

HYDRAULIC POWER DRIVE UNIT

RELATED APPLICATIONS

This application is a continuation-in-part of application Ser. No. 07/828,308, filed Jan. 30, 1992, now U.S. Pat. No. 5,201,479 and entitled, "SELF-MONITORING LATCH PIN LOCK FOR FOLDING WING AIRCRAFT," also assigned to The Boeing Company.

TECHNICAL FIELD

This invention relates to a hydraulic power drive unit, particularly to such a unit in which linear hydraulic movement is converted, through a differential, into rotational movement and may be especially adapted and controlled to operate a secondary lock mechanism for a folding wingtip aircraft.

BACKGROUND OF THE INVENTION

The concept of folding wing airplanes is commonly associated with fighter aircraft that are stationed onboard aircraft carriers. Because an aircraft carrier has a small flight deck and limited hanger space compared to ground-based facilities, carrier-based aircraft must have folding wings that reduce their wing span for storage purposes. Providing folding wings on carrier aircraft enables a larger number of planes to be based on a carrier than would otherwise be possible and facilitates rapid movement of planes between flight deck and hanger bay.

The same kind of space considerations have not previously applied to commercial passenger aircraft or jets. As a result, there has been little or no need to have folding wings on commercial planes. The typical airport served by a passenger jet generally has ample space for aircraft maneuvering on the ground, and for parking and passenger ingress and egress. However, for reasons discussed below, this may now be changing.

Current and projected passenger demographics indicate that the use of larger planes are more economical for commercial airlines to operate. Aircraft size alone, however, is not the only factor controlling how commercial airlines move a given passenger volume from point A to point B in the most efficient manner. The major airlines typically have a fixed number of passenger gates at each major airport. Most major U.S. airports have either been built or renovated during the last twenty or thirty years. During such building process, passenger gates were spaced from each other a distance that was generally considered to be optimal given the size and number of aircraft in use at the time. The present trend toward using larger aircraft is accompanied by problems resulting from significantly larger wing spans than the majority of commercial airplanes in use twenty or thirty years ago. This results in fewer airplanes taking up a fixed amount of parking or berth space around the typical terminal and, consequently, reduces the number of usable passenger gates. The end result is that larger airplanes tend to make it more difficult to accommodate airline scheduling that requires a large volume of flights.

Space restriction is becoming a significant problem at modern airports. The folding wings of carrier-based airplanes, discussed above, suggest one solution to this problem. Applying this military aircraft solution to commercial jets, however, presents several logistical problems in order to achieve the inherently higher desired level of safety.

It is well-known that The Boeing Company, the assignee of the invention disclosed and claimed herein, is presently developing a new model of commercial jet designated as the "777." This jet is larger than Boeing's earlier models and, consequently, has a larger wing span. At least one study done by The Boeing Company estimates that there are approximately one hundred thirty usable gates at six major airports for The Boeing 767 and the DC-10. However, only approximately twenty of these same gates would be suitable for use by the 777, because of its larger wing span.

Providing 777 jets with folding wingtips can enable a larger number of this particular airplane model to be parked or placed around a given terminal at the same time. It has been estimated that nearly as many usable gates would be available for a 777 that is modified in this way as are presently available for the 767 and DC-10. A 777 with folding wingtips would require a latching hinge mechanism for releasably interlocking the wingtip with the inboard portion of each wing. Safety considerations dictate that such system must have the utmost structural integrity and fail-safe operation. As the skilled person would realize, an aircraft with folding wings presents additional design and safety problems that are not present on aircraft with conventional wings. The wings must be designed so that they do not accidentally fold during flight and that the latching and locking mechanism does not falsely indicate "latched and locked" prior to take-off when that condition is not true.

In military aircraft, several latch pins are used to hold each folding wing in place. These are locked by an independently-operated locking mechanism. The common method used to detect whether or not the latch pins are locked is a wing-mounted red "flag" that is driven above the wing contour by mechanical connections when the latch pins are unlocked. When they are locked, the flag is conversely driven below or flush with the wing contour. The pilot or flight crew determines the proper lock state merely by viewing the position of the flag. For high reliability, the flag is driven directly by the mechanism that locks the latch pins, with a minimum of interconnections. This necessitates physically locating the flag close to the locking mechanism.

Design safety for military aircraft is, by necessity, viewed differently than for civilian aircraft. Military operations typically require optimum airplane performance in order to provide the pilot with the best chance of survival. Military airplane design anticipates that more pilots are lost as a result of combat than equipment failure. Hence, safety considerations are balanced with combat performance considerations. Since combat is not a consideration in the commercial arena, design safety takes on the utmost importance.

The FAA is the government agency that is responsible for closely regulating commercial aircraft design in the United States. Likewise, it is a goal of The Boeing Company to design aircraft with unmatched levels of safety. The type of fail-safe operation required by standards of both The Boeing Company and the FAA for commercial aircraft may not be met by the above-described system used on military aircraft. One known drawback to the military design is that the position of the flag does not necessarily provide an indication as to the integrity of the locking mechanism itself. Another drawback to the military design is that it is not particularly well-suited for most modern commercial jets, simply because the wings of such jets are not visible to the flight crew. Therefore, using a similar mechanical flagging technique in connection with the 777 folding wingtip would probably place an unacceptable operating burden on the airline that operates the plane.

The Boeing Company has designed a folding wingtip latching and locking mechanism which meets or exceeds the above-discussed safety considerations in an efficient and cost-effective manner. One aspect of the mechanism is that the hinge of the wingtip is latched into a spread position by a series of latch pins which extend through aligned openings in a clevis and lug connection. Each latch pin is then locked into place by independently-operated primary locks and a mechanically-linked series of secondary locks. The secondary locks are rotated between locked and unlocked positions by the hydraulic power drive unit of the present invention which is described in the following specification, claims and drawings.

SUMMARY OF THE INVENTION

The power drive unit of the present invention uses a linear hydraulic piston/cylinder unit to generate linear movement from hydraulic pressure. A set of longitudinally-spaced gear teeth in the form of a rack are included on the piston/cylinder unit. The pinion gear operatively engages and is driven by the rack. This engagement converts the linear movement of the piston/cylinder unit into rotary movement. A differential is provided which is driven by the pinion gear and selectively transfers drive power to two separate rotary drive outputs.

In preferred form, the hydraulic piston/cylinder unit is extensible in length and the pinion gear is co-axial with at least one of the drive outputs.

According to another feature of the invention, the differential may include two sets of planet gears, two sun gears, and a carrier. The carrier is operatively connected to the pinion gear for rotation around an axis. The planet gears are rotatably mounted on the carrier and are movable in an arcuate path around the axis. The sun gears are positioned radially inwardly of the planet gears and are rotatable coaxially with the axis. Each sun gear is operatively connected to independently drive a separate one of the drive outputs.

Position of each drive output may be monitored by a switch means which is actuated by a cam surface moved in response to operation of the power drive unit. In preferred form, the cam surface is located on the carrier.

According to another feature of the invention, a hydraulic control means is provided which includes a switching valve responsive to a reversal of hydraulic supply pressure. A switching inhibit means may be utilized to limit operation of the hydraulic control means prior to actuation of the piston/cylinder unit. In preferred form, the inhibit means includes an inhibit dog on the switching valve and a separate cam surface on the carrier positioned to limit movement of the inhibit dog when the carrier is in a predetermined position. Thereby, switching of the valve prior to actuation of the power drive unit is limited or prevented.

Another important feature of the invention is that the use of a linear hydraulic piston/cylinder unit having variable volume fluid chambers which have an inherent differential in surface area to which pressure is applied will cause the power drive unit to be biased toward a "locked" position when equal or neutral pressure is applied to both pressure and return hydraulic lines.

Other features, aspects and advantages of the present invention will become apparent from a reading of the following specification and claims, as well as review of the various figures of the drawing. Each of these parts of the application together are intended to comprise the disclosure of the present invention.

BRIEF DESCRIPTION OF THE DRAWINGS

Like reference numerals are used to represent like parts throughout the various figures of the drawing, wherein:

FIG. 7 is a side view of the hydraulic power drive unit shown in FIG. 5 and taken substantially along line 7—7 of FIG. 5;

FIGS. 8 and 9 are cross-sectional views showing engagement of the drive cylinder rack with the drive pinion and taken substantially along line 8—8 of FIGS. 5 and 11;

BEST MODE FOR CARRYING OUT THE INVENTION

Figure 1:
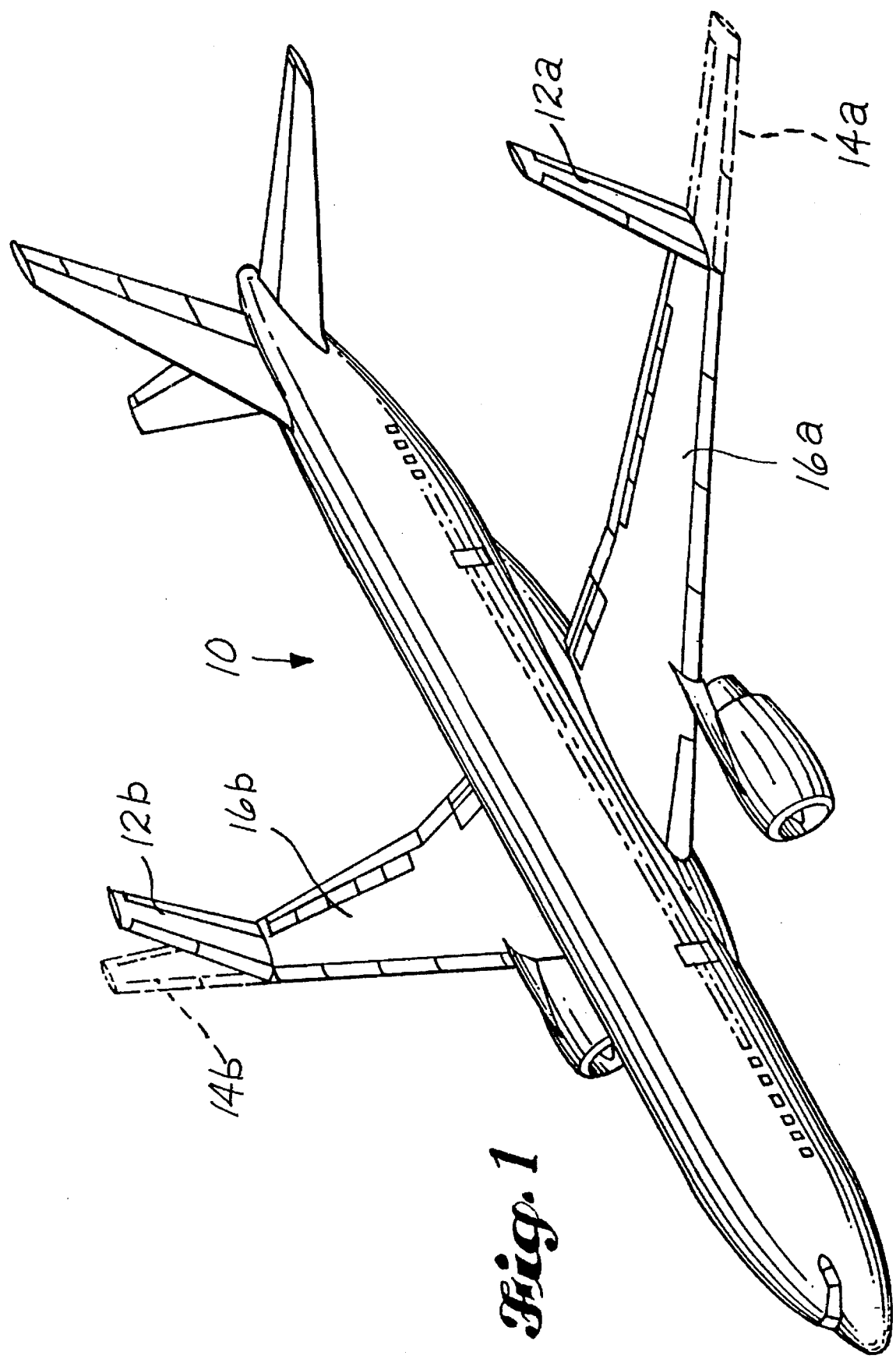
FIG. 1 is a pictorial view of a folding wingtip aircraft showing the wingtips in a folded position and with the spread position shown in phantom lines.

Referring first to FIG. 1, shown generally at 10 is a commercial jet airliner that is more or less conventional in configuration, except that it is provided with folding wingtips 12a, 12b. The solid lines show the wingtips 12a, 12b in an upwardly-folded position, for taxiing and parking, to load and offload passengers at a conventional airport terminal.

The dashed lines 14a, 14b show the same wingtips spread and locked into place with the wing inboard portions 16a, 16b for aircraft flight. The hydraulic power drive unit of the present invention for controlling a secondary lock mechanism for lock pin actuators of a folding wingtip aircraft is primarily for use in conjunction with the kind of aircraft shown in FIG. 1. It is to be understood, however, that such system may be well-suited for use in other kinds of aircraft, including those having military applications, and that the hydraulic power drive unit of the present invention may have other suitable applications.

Figure 2:
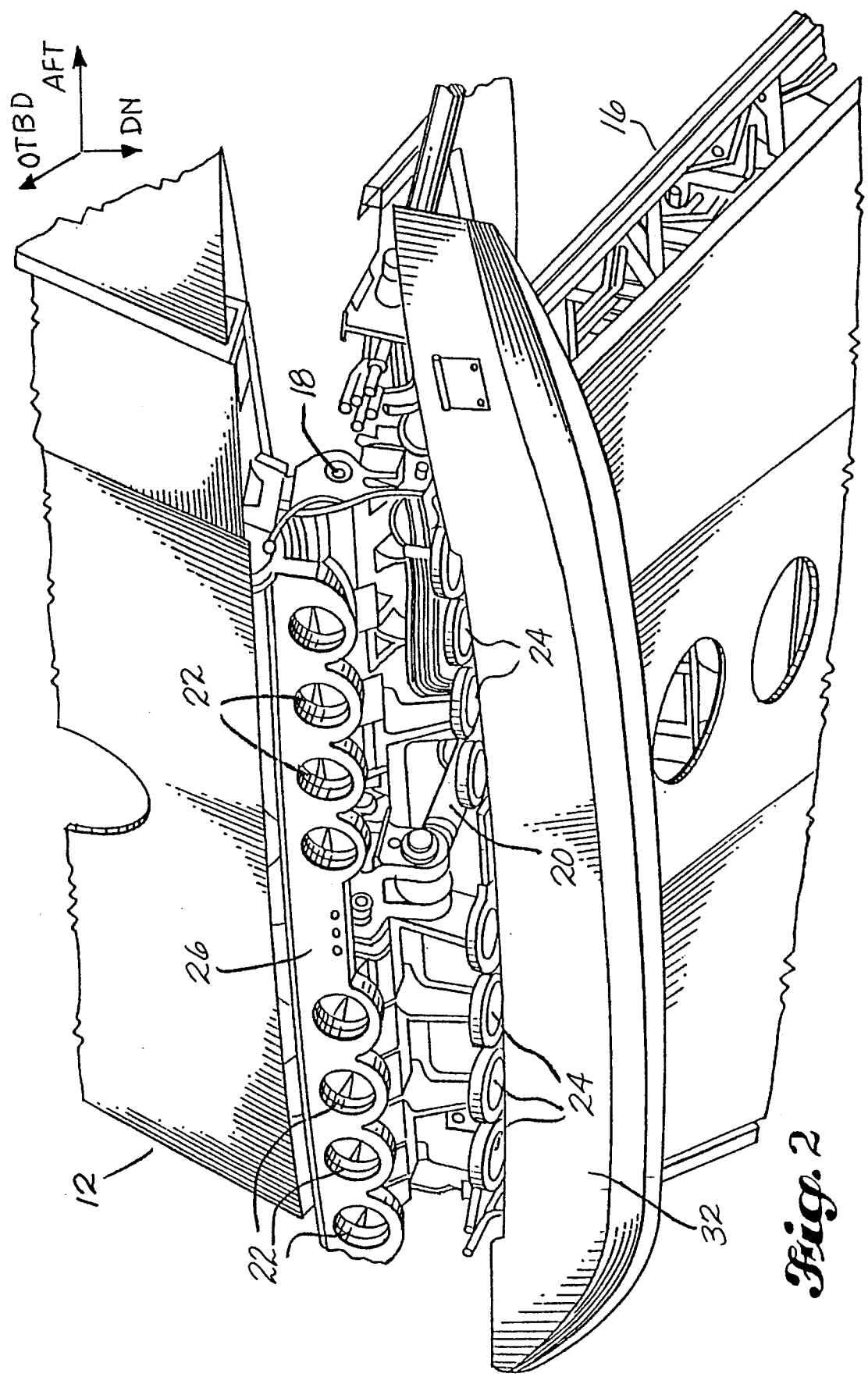
FIG. 2 is a fragmentary pictorial view of the hinge connection of a folded aircraft wingtip.

Referring now to FIG. 2, the wingtip structure 12 is mounted to the inboard portion 16 by a hinge structure 18. Such structure is identical for either wing, although as the skilled person would realize, the hinge structure for one wing would probably be mirrored in the other, corresponding to the fact that one wing is left-handed while the other is right-handed. Since the construction of either wing is substantially the same, the letter subscripts "a" and "b" used above to indicate left and right-handedness are deleted in FIG. 2 and from the other figures.

Figure 3:
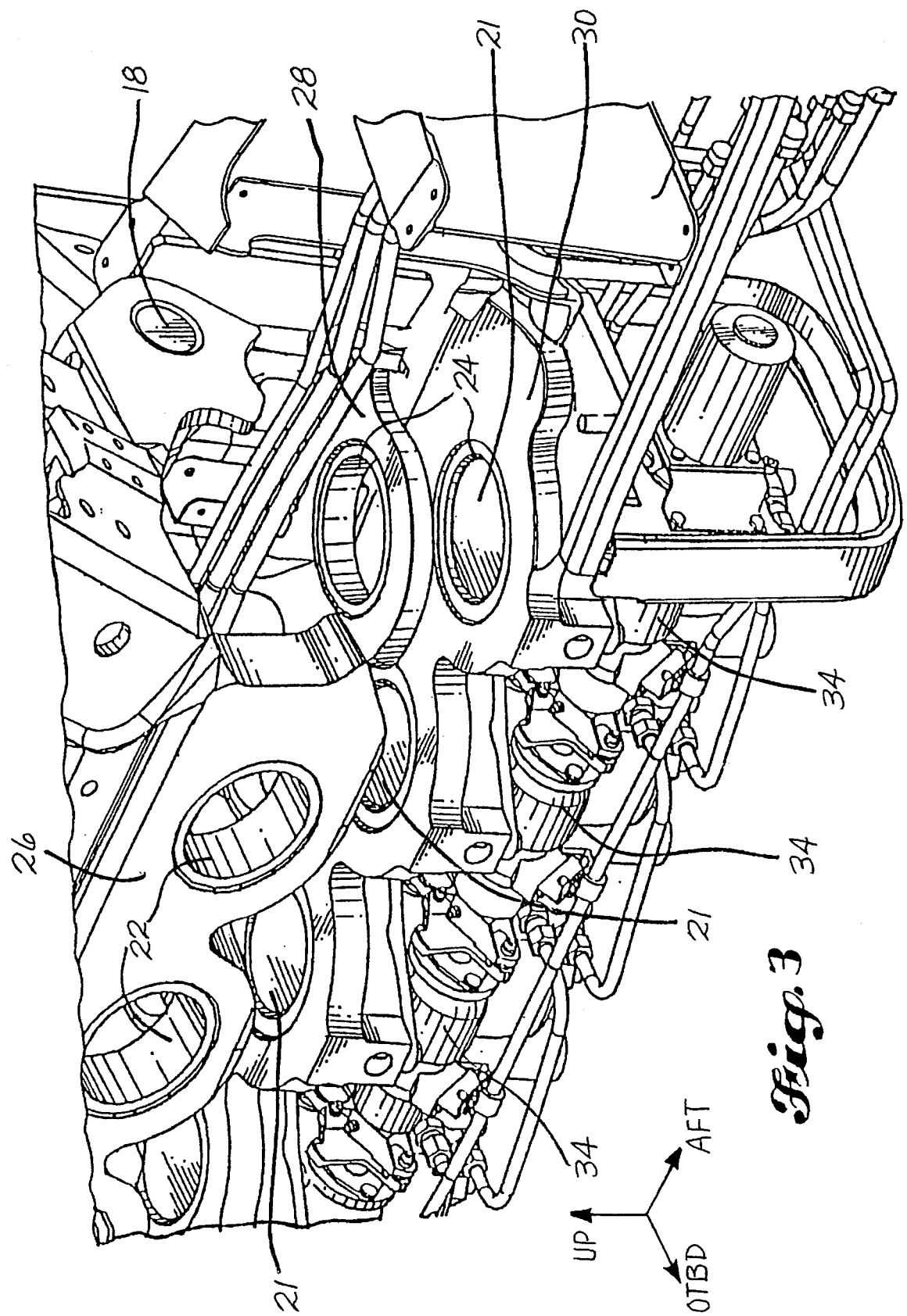
FIG. 3 is a fragmentary detailed view showing a folding wingtip hinge with a clevis and lug latching mechanism along with a bank of latch pin actuators.

Folding and spreading movement of the wingtip 12 relative to the wing inboard portion 16 is driven by a hydraulically-operated actuator 20. The wingtip 12 is locked in a folded condition by the actuator 20. The wingtip 12 is locked in a spread position by insertion of latch pins 21 (shown in FIGS. 3 and 4) through multiple openings 22, 24 in a lug and clevis-type connection. The lug is shown generally at 26 in FIGS. 2 and 3. The upper and lower leaves of the clevis portion are shown generally at 28, 30. A fairing 32 which projects below the wing 16 houses latch pin actuators 34 (shown in FIG. 3) as well as the hydraulic power drive unit of the present invention.

Retraction of the actuator 20 pulls the wingtip 12 downwardly until it is contiguous with the wing's inboard portion 16. In this position, both the tip 12 and the inboard portion 16 combine to form a single, continuous airfoil for flight. Conversely, extending the actuator 20 lifts or folds the wingtip 12. In accordance with the invention, this is done after the aircraft 10 has landed, so that its wingspan will be reduced, making the aircraft better suited for taxiing and parking adjacent other planes at an airport.

Figure 4:
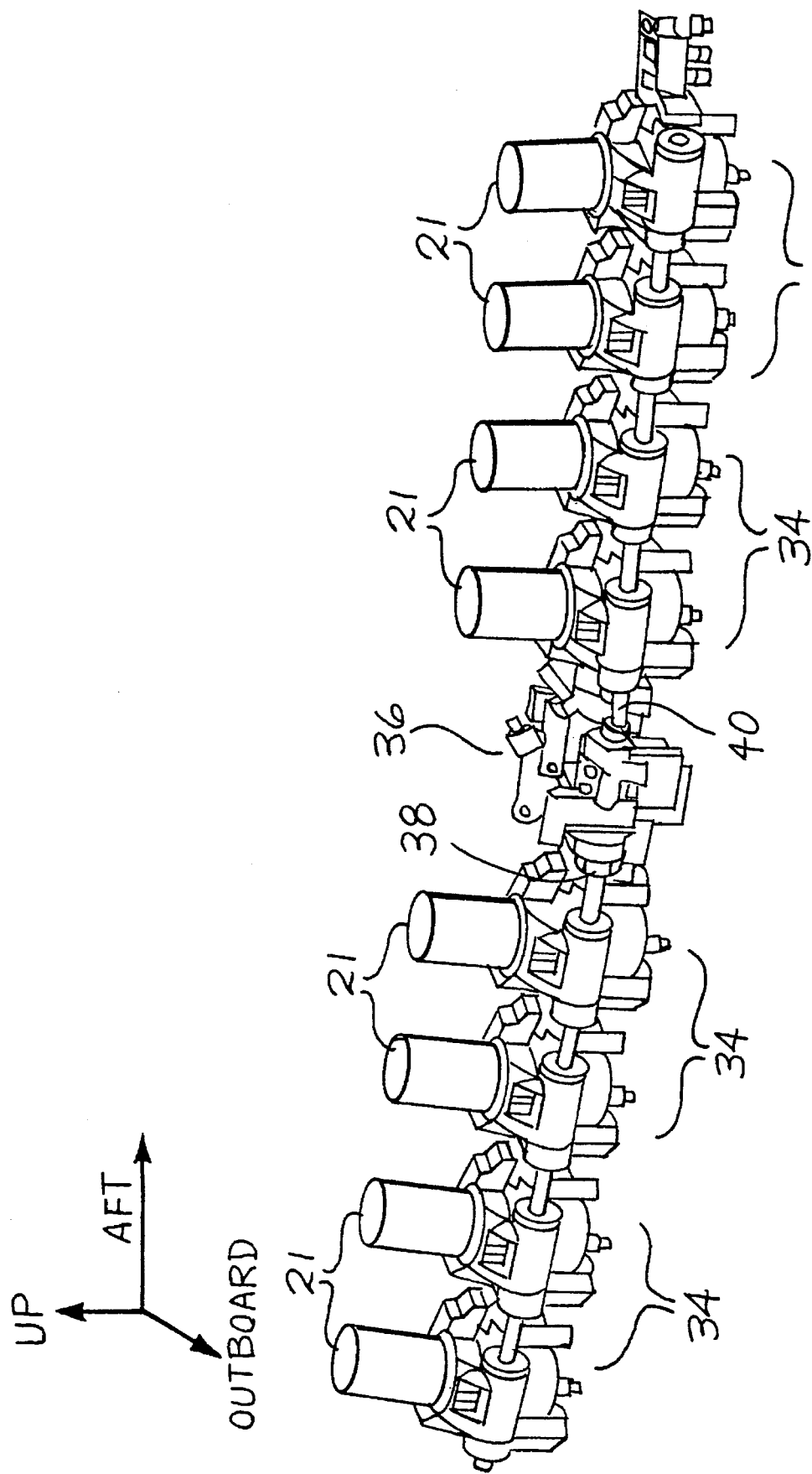
FIG. 4 is a pictorial view of a hydraulic power drive unit according to the present invention for operating secondary lock mechanisms of fore and aft banks of latch pin actuators.

Referring now also to FIG. 4, therein is shown at 36 a hydraulic power drive unit (PDU) according to the preferred embodiment of the present invention. Although it may lend itself to other useful applications, the power drive unit 36 of the present invention was designed to rotationally actuate two series or banks of secondary locks on latch pin actuators 34 used to latch a folding aircraft wingtip in a spread position. In preferred form, the PDU 36 can be positioned at a midpoint in a row of actuators 34 and includes axially-aligned, separate drive outputs 38, 40 at opposite ends thereof.

Figure 5:
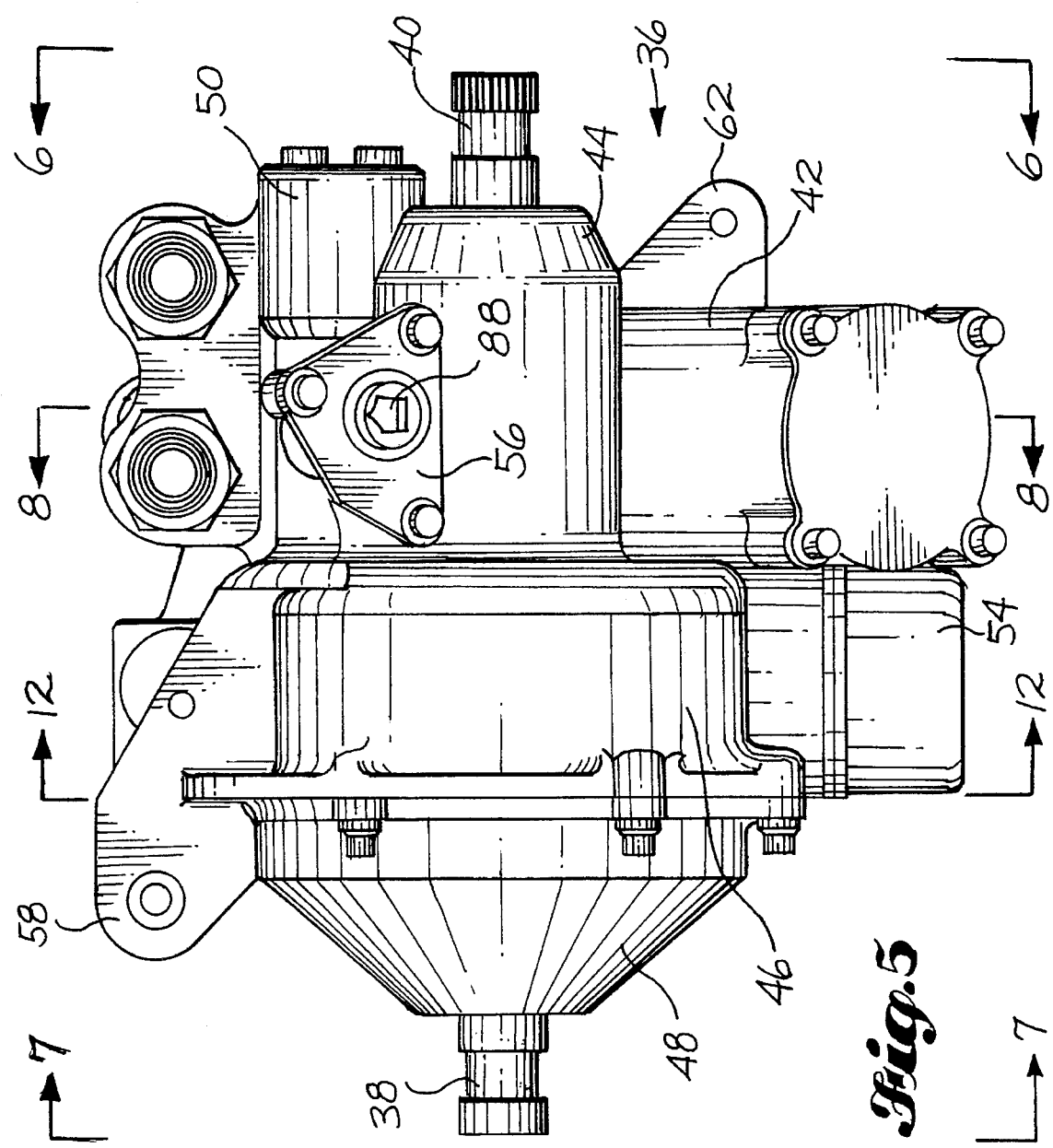
FIG. 5 is an outboard plan view of a hydraulic power drive unit according to the present invention.
Figure 6:
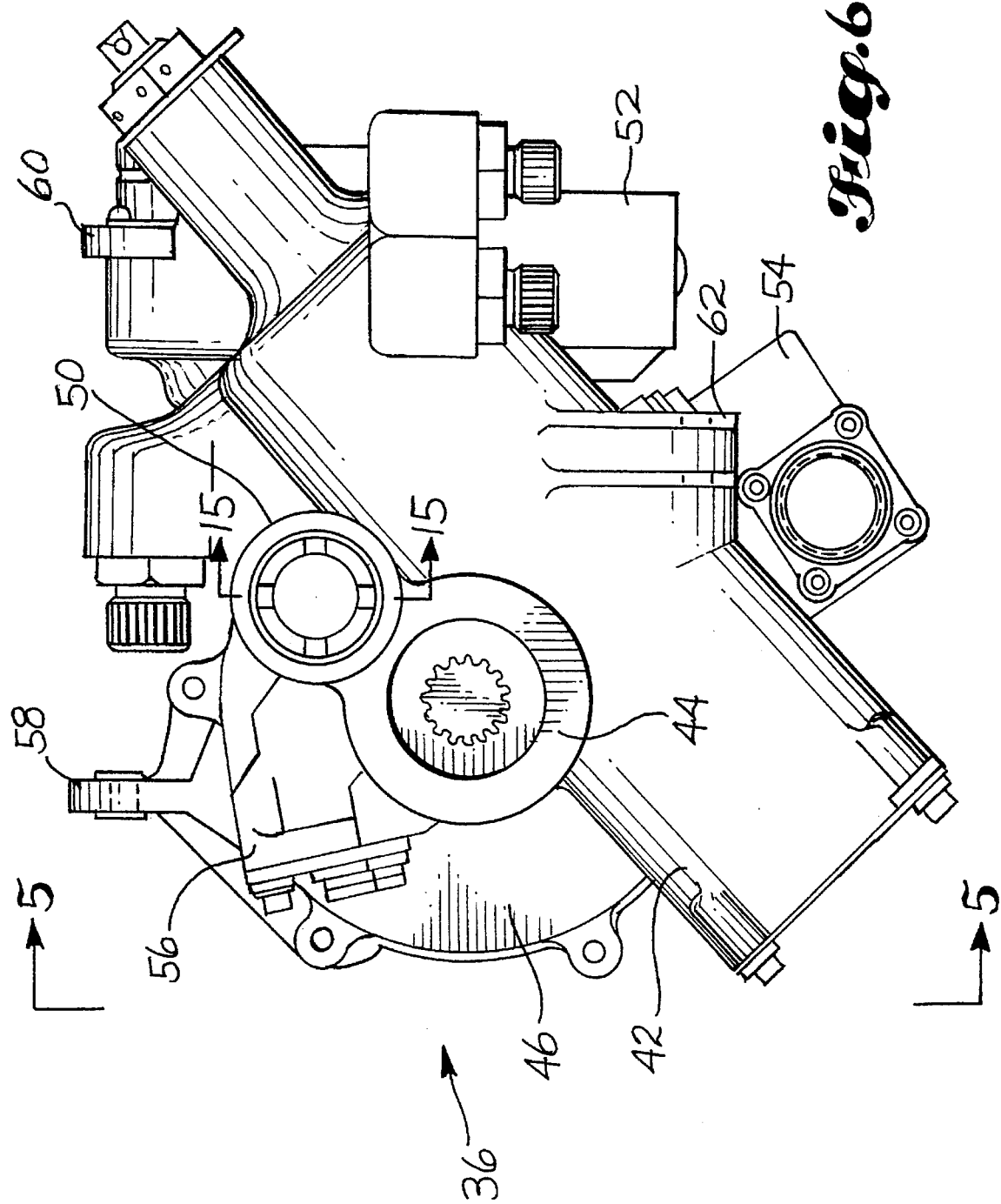
FIG. 6 is a view of the hydraulic power drive unit shown in FIG. 5 taken substantially along line 6—6 of FIG. 5.

Referring to FIGS. 5–7, general external components of the PDU 36 are shown. The PDU 36 is substantially enclosed within and supported by a housing having multiple parts or compartments. A linear hydraulic piston/cylinder compartment 42 is positioned adjacent a pinion compartment 44. Axially aligned with the pinion compartment 44 is a differential compartment 46 which includes an end cover 48. Another compartment 50 of the housing contains a selector valve and is positioned adjacent the differential compartment 46 and axially parallel to the pinion compartment 44. The housing also includes a compartment 52 for a solenoid valve and compartment 54 which houses sensor switches, the operation of which will be described later. Adjacent and tangential to the pinion compartment 44 is a compartment 56 which houses a manual lockout that engages with the pinion. The housing is mounted onto the fixed inboard portion of the airplane wing 16 by means of three mounting ears 58, 60, 62 which include appropriately-sized openings and are positioned for receiving appropriate fasteners.

Referring now to FIGS. 8 and 9, therein is shown at 64 a linear hydraulic piston/cylinder unit which is the primary drive of the PDU 36. The unit includes a fixed piston rod 66 and movable cylinder 68. The rod 66 is mounted at one end of the housing compartment 42 and includes first and second internal passageways 70, 72 which provide a flow of hydraulic pressure to first and second chambers 74, 76, respectively, in the cylinder 68. The first chamber 74 is on the rod side of a piston head 78 and the second chamber 76 is on the cylinder side of the piston head 78. A cylinder head 80, held in place by a threaded retaining nut 82, closes the chamber 74 around the piston rod 66.

Carried on one exterior side of the cylinder 68 is a set of gear teeth in the form of a rack 84. This rack 84 of gear teeth is sized and positioned to mesh with teeth of an adjacent pinion gear 86. Linear movement of the cylinder 68 caused by applying hydraulic pressure to either the piston chamber 74 or cylinder chamber 76 results in rotational movement of the pinion gear 86. In preferred form, one stroke length of the moving cylinder 68 and rack 84 carried thereon results in approximately 165° of rotation to the pinion gear 86.

Figure 10:
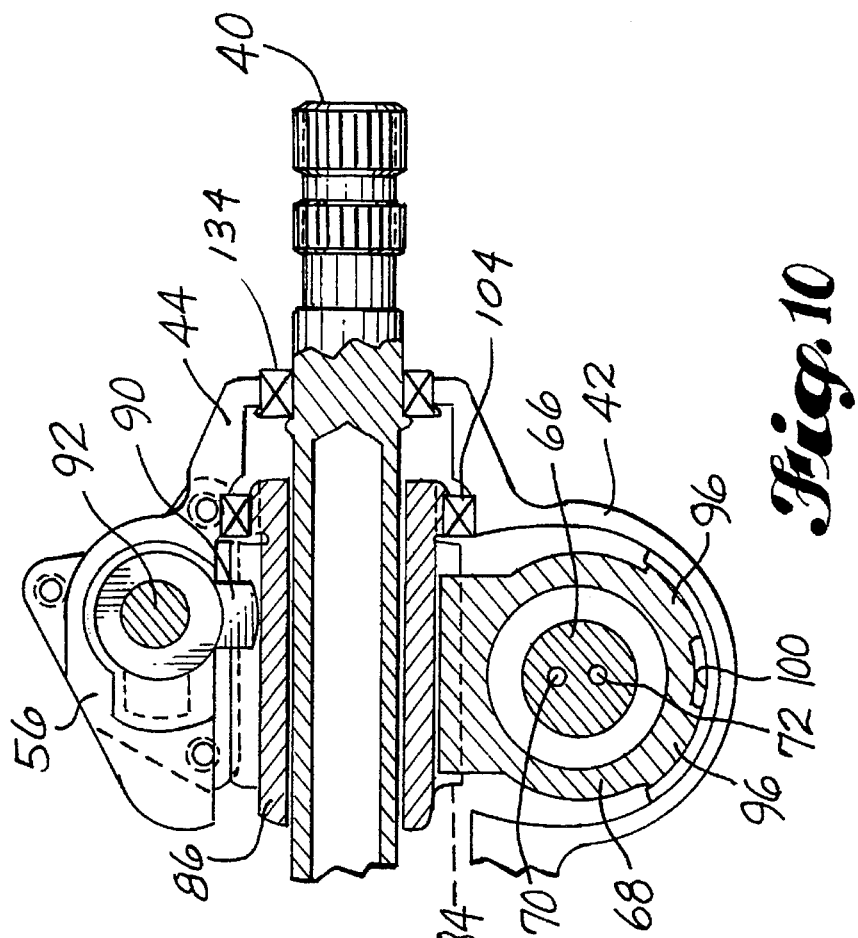
FIG. 10 is a fragmentary sectional view taken substantially along line 10—10 of FIG. 8.

The pinion gear 86, and consequently the cylinder 68, can be manually locked in position at one extreme stroke of the cylinder 68. This position corresponds with a fully-locked position of the latch pin actuators 34 to which the PDU 36 is connected, as will be explained more fully later. In preferred form, the manual lock-out mechanism is operated externally by means of a key or wrench fitted into a socket 88 such that a cam 90 mounted on an internal shaft 92 can be rotated into an appropriately positioned notch 94 on the pinion gear 86. This position is illustrated in FIGS. 8 and 10.

Referring to FIG. 9, the locking cam 90 is shown rotated to an unlocked position, allowing movement of the pinion gear 86. The cylinder 68 is shown at its opposite end of stroke, hydraulic pressure having been applied to the rod side chamber 74. Linear movement of the rack 84 has resulted in clockwise rotation of the pinion gear approximately 165°. Substantially opposite the rack 84 on the cylinder 68 are bearing members 96, 98 which ride on an inside surface 100 of the piston/cylinder compartment 42 of the housing. This can also be seen in FIG. 10. These slide bearings 96, 98 cause the rack 84 to remain meshed with teeth of the pinion gear 86 and minimize friction. This arrangement of bearings 96, 98 carries lateral loads of the cylinder 68, thereby isolating the piston 78 and piston rod 66 from such lateral loads.

Figure 11:
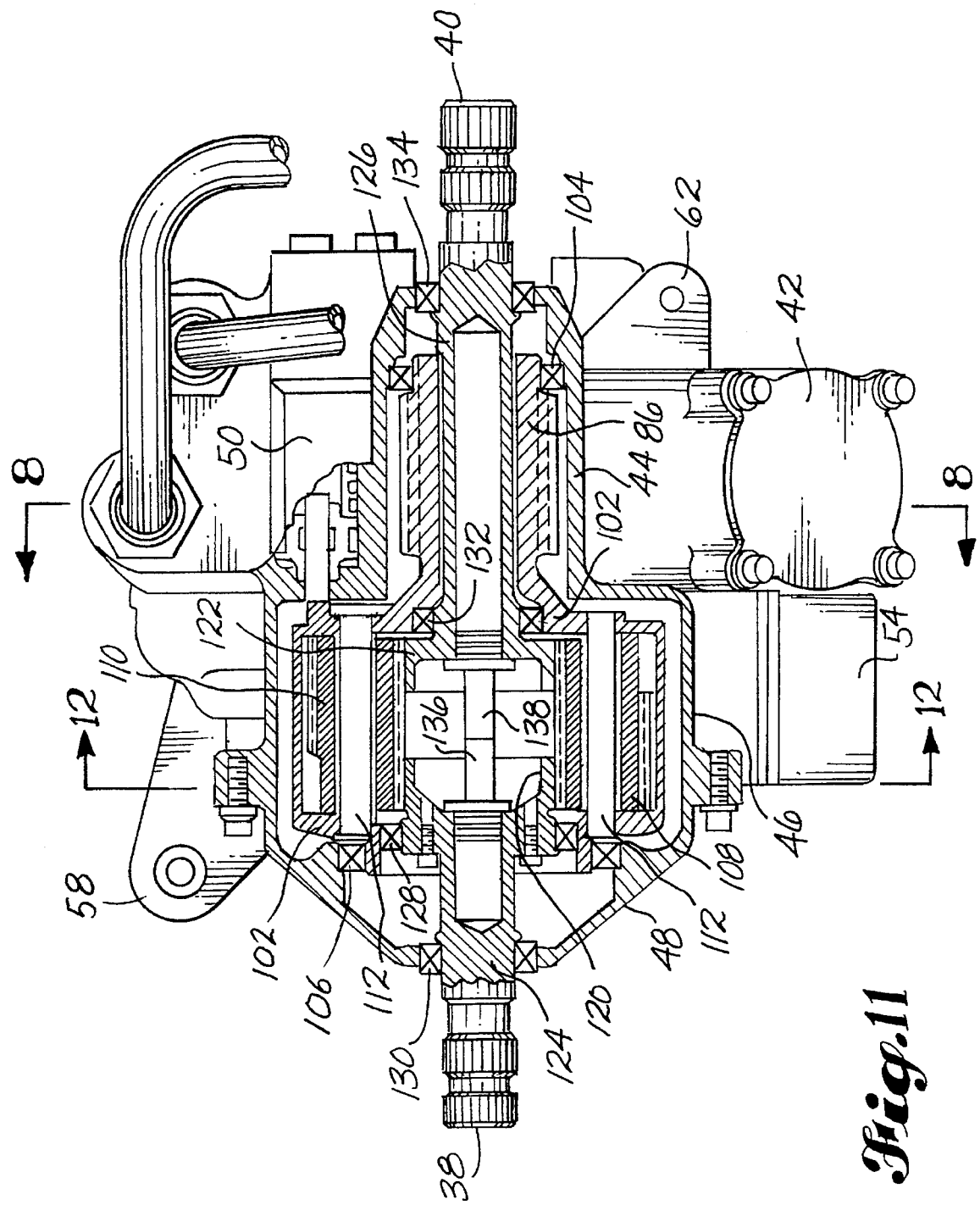
FIG. 11 is a view similar to FIG. 5 partially cut away and sectioned to show the power transferring drive differential of the present invention.

Referring now to FIG. 11, and specifically to the pinion gear 86 shown in longitudinal section, it can be seen that a planetary gear cage or carrier 102 extends axially from the pinion gear 86 and is located in the differential housing 46, 48. The pinion gear 86 and carrier 102 are integrally formed and are carried by bearings 104, 106 in the housing 44, 48. Rotation of the pinion gear 86 by movement of the cylinder 68 results in identical rotation of the carrier 102.

Figure 12:
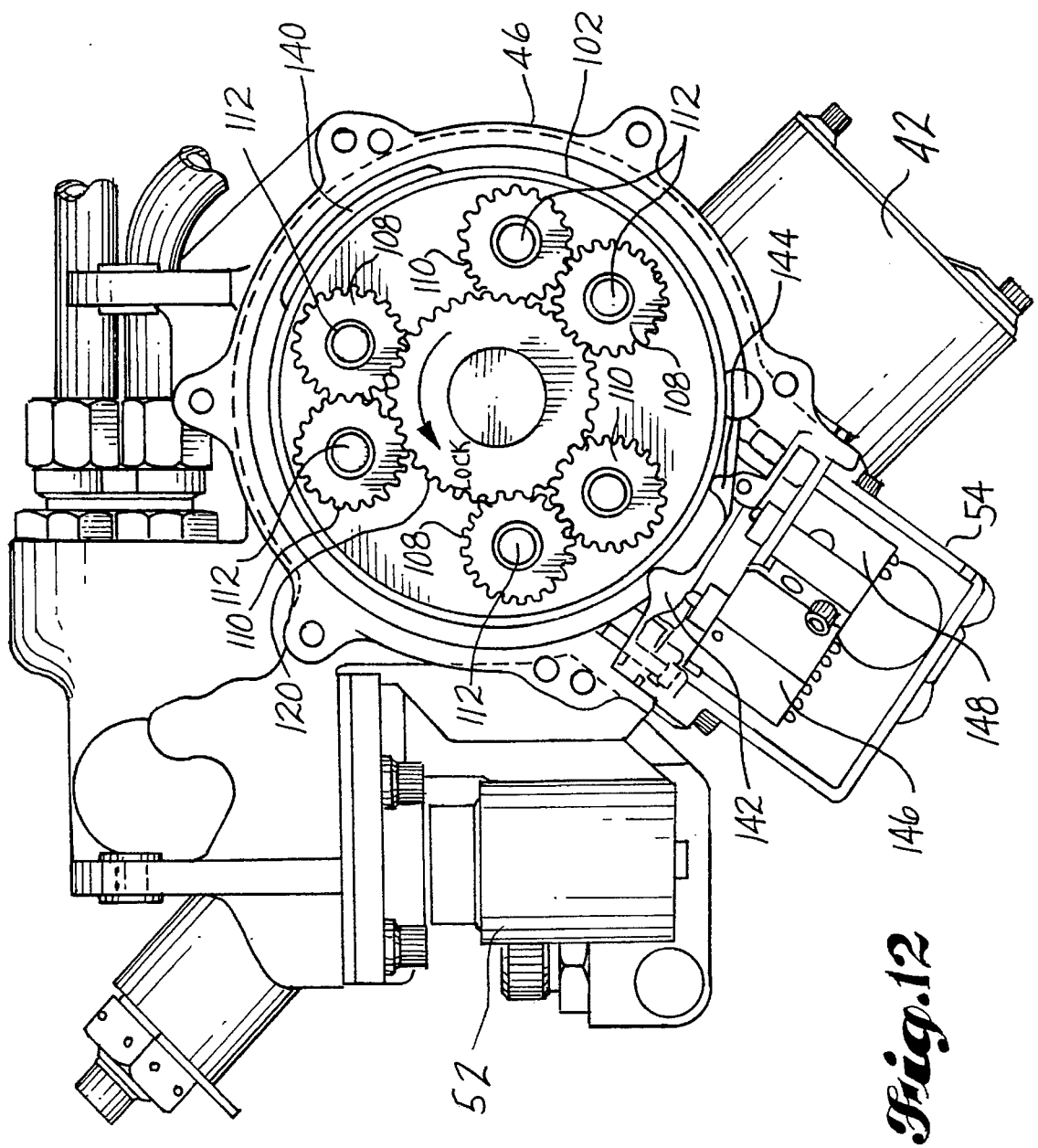
FIG. 12 is a cross-sectional view showing differential gearing and control switches of the present invention and taken substantially along line 12—12 of FIGS. 5 and 11.

Referring also to FIG. 12, it can be seen that six planet gears 108, 110, arranged in three coordinating pairs, are mounted on the carrier 102. Each planet gear 108, 110 is mounted for free rotation on an axle 112. The six axles 112 are carried by the cage 102 in an aligned arcuate path which is concentric with the axis of the pinion gear 86.

Figure 13:
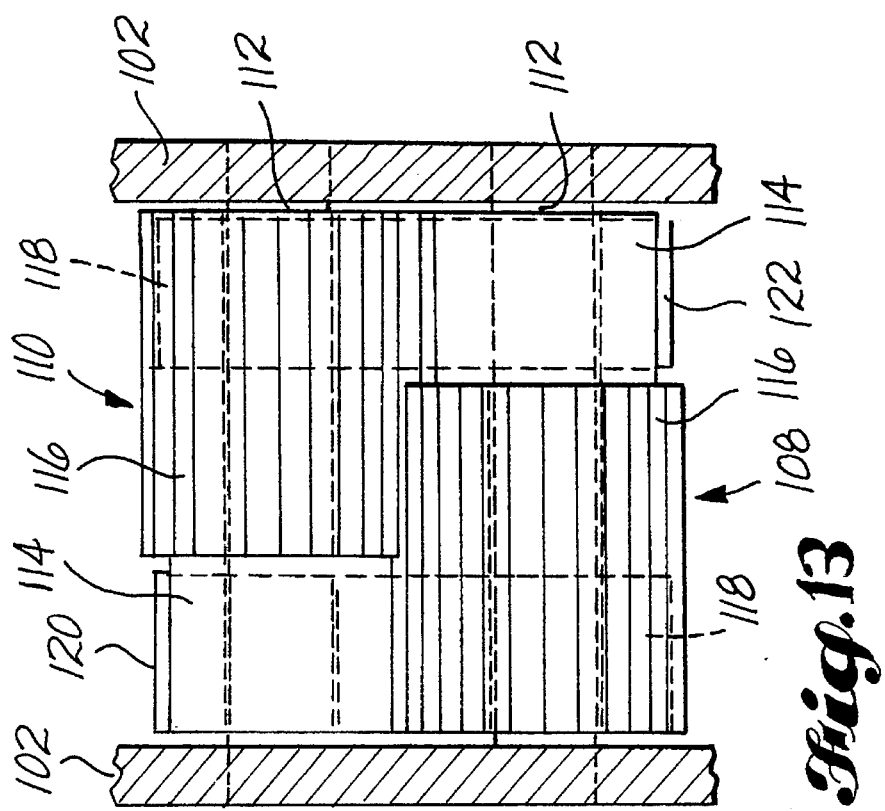
FIG. 13 is a fragmentary view showing one pair of planet gears and taken substantially along line 13—13 of FIG. 12.

As can best be seen in FIG. 13, but also in FIGS. 11 and 12, the planet gears 108, 110 each have three axially-positioned portions or regions. A first portion 114 comprises approximately one-third the axial length of the planet gear 108,110 and is devoid of teeth. The second and third portions 116, 118 include congruous intermeshing teeth. Each pair of planet gears 108,110 includes one gear axially reversed of the other such that the teeth of each mid portion 116 intermesh and the untoothed section 114 of one gear 108 is adjacent a toothed end portion 118 of its companion gear 110. As expected, the intermeshing of the mid portions 116 requires that rotation of one gear 108 on its axle 112 will result in rotation of the other gear 110 on its axle 112, but, of course, in the opposite direction.

Positioned radially inwardly of the carrier 102 and planet gears 108,110 are a pair of axially spaced sun gears 120, 122. The sun gears 120, 122 include teeth which are sized and positioned to intermesh with end portions 118 of one set of planet gears 108, 110, respectively. Specifically, three planet gears 108 intermesh with sun gear 120 at positions which are spaced apart approximately 120° relative to one another. Rotation of either the planet gears 108 or the sun gear 120 will result in converse rotation of the other. Likewise, planet gears 110 intermesh with sun gear 122' and are also spaced approximately 120° relative to one another. Rotation of either the planet gears 110 or the sun gear 122 will result in converse rotation of the other.

Sun gear 120 includes an axially-directed shaft 124 which extends outwardly of the housing 48 and ends in drive output 38. Sun gear 122 includes an axially-extending shaft 126 which extends freely through the pinion gear 86, outward of the pinion gear housing 44 and terminates in drive output 40. The sun gears 120, 122 and their respective shafts 124, 126 are axially aligned and oppositely directed. Sun gear 120 and shaft 124 are carried by bearings 128, 130. Sun gear 122 and shaft 126 are carried by bearings 132, 134. A pair of spacers 136, 138 extend axially inwardly from the sun gears 120, 122 to hold the gears in an appropriate axially-spaced position. In preferred form, the spacers 136, 138 are made of a self-lubricating thermoplastic material. This allows the end portions which contact each other to act as simple bearings when necessary. Under normal circumstances, both shafts 124, 126 will be rotated simultaneously. Under some conditions, as will be explained below, one shaft could remain stationary or rotate at a different rate relative to the other.

As can be understood from a study of FIGS. 11, 12 and 13, the differential gearing of the PDU 36 allows the drive outputs 38, 40 to operate and be driven independently of one another. As previously described, linear movement of the cylinder 28 carrying the gearing rack 84 causes rotation of the pinion gear 86 and, in turn, the differential carrier 102. Under normal circumstances, when both drive outputs 38, 40 are permitted to rotate together, the planet gears 108, 110 do not rotate relative to the carrier 102 or their axles 112. Instead, they are moved with the carrier 102, without independent rotation, along the previously-described arcuate path. Because neither set of planet gears 108,110 is rotating relative to the other, the sun gears 120, 122 are also rotated around the same axis and at the same rate as the carrier 102 and pinion gear 86. In this situation, rotation of the drive outputs 38, 40 is identical and the PDU 36 is acting in a direct-drive capacity.

If one of the outputs 38, 40 is stalled or slowed relative to the other, the differential gearing allows the other output to continue to receive power, but at an increased speed. For example, if drive output 38, including its associated drive shaft 124 and planet gear 120, becomes stalled while the carrier 102 is being rotated, one set of planet gears 110 which have teeth intermeshed with the sun gear 120 will begin to rotate relative to the carrier 102 and their supporting axles 112, around the periphery of the sun gear 120. The rotation of planet gear 108, as previously described, causes rotation of its associated and intermeshed planet gear 110 in the opposite direction.

Referring to FIG. 12, in the above-described scenario in which sun gear 120 was stalled, one planet gear 108 of each pair would be rotated in the counter-clockwise direction as it is moved through a counter-clockwise arcuate path by the carrier 102 around the sun gear 120. In turn, planet gears 110, which do not engage sun gear 120, would be rotated oppositely in a clockwise direction. Referring now also to FIGS. 11 and 13, it can be seen that this rotation of planet gears 110 compounded by their being carried in an arcuate path by the carrier 102 will cause the second sun gear 122 to be rotated at an increased speed. As a result, output 40 will reach its terminal point of rotation prior to complete reciprocation of the linear hydraulic piston cylinder unit 64 and prior to full rotation of the carrier 102. Thereafter, full power would then be diverted to driving the previously-stalled sun gear 120 and its corresponding output 38. If the resistance which had stalled the output 38 is overcome, sun gear 120, shaft 124 and output 38 will then be rotated, again at an increased speed relative to rotation of the cage 102 and pinion gear 86. Under such conditions, the planet gears 108, 110 would begin to rotate oppositely of that previously described and a converse reaction would divert power to the sun gear 120. This causes the output 38 to "catch up" and reach its termination of rotation when the carrier 102 has fully rotated and the piston cylinder unit 64 has fully reciprocated.

Referring now specifically to FIG. 12, the position of the carrier 102, and consequently the drive outputs 38, 40, can be monitored by the system. In preferred form, the carrier includes a radially-directed cam surface 140 which is positioned to contact pivotally-mounted levers 142, 144 located in the switch housing 54. Also in the switch housing 54 are corresponding snap-action switches 146,148 which are actuated by movement of the levers 142, 144, respectively.

FIG. 12 shows the PDU 36 in the "locked" position. As discussed above, the preferred use of the PDU 36 is to operate a series of ganged-together secondary locks on latch pin actuators 34 used for holding folding wingtips 12 of an airplane 10 in a spread position. "Locked," as used herein, refers to one end of the PDU's cycle in which the outputs 38, 40 have been fully rotated in one direction and the piston cylinder unit 34 is fully extended, as shown in FIG. 8.

When "unlocking," the carrier 102 and drive outputs 38, 40 are rotated clockwise as viewed in FIG. 12. Rotation through approximately 131°–135° will position the PDU 36 in an "unlocked" position in which the cam surface 140 is rotated into position to depress lever 144, thereby actuating switch 148. The PDU 36 is stopped in this position due to a mechanical-type interference built into the latch pin actuators 34, indicating that each latch pin is "unlocked" but remains "latched." As each latch pin 21 is retracted, the operation of which forms no part of the present invention, this mechanical interference is removed allowing the PDU 36 to rotate itself and the secondary locks through approximately another 30° of rotation. In this position, the cam surface 140 depresses both levers 142,144, thereby actuating both switches 146, 148. This selective actuation of the switches 146, 148 allows the position of the PDU 36, and consequently the position of both the secondary locks and latch pins, to be monitored.

Figure 14:
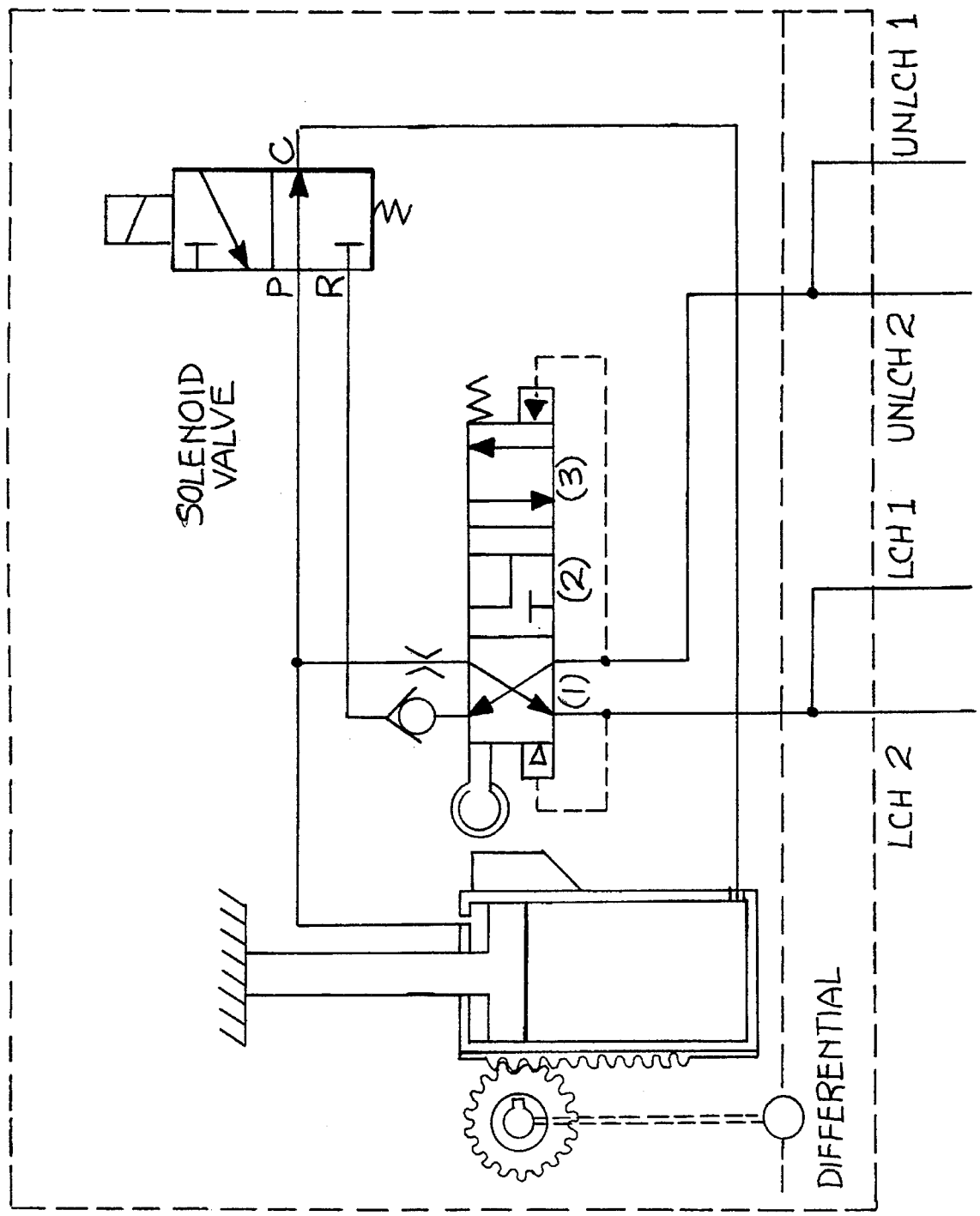
FIG. 14 is a schematic diagram illustrating the preferred arrangement of hydraulic control circuitry according to the present invention.

Referring to FIG. 14, therein is shown a schematic representation of a preferred internal control system for the PDU 36. In preferred form, the same hydraulic pressure system which operates the latch pin actuators 34 is used to operate the PDU 36. This reduces the total number of hydraulic lines required to be run along the length of the stationary wing portion 16 to the relatively-remote and crowded region of the wingtip hinge. The PDU 36 is connected in parallel to the latch and unlatch hydraulic pressure lines. When hydraulic pressure is placed on the LATCH side, the UNLATCH line acts as a return line. When hydraulic pressure is placed on the UNLATCH line, the LATCH line acts as a return line.

In order to reduce the total number of line connection required, an internal "T" connection is used. Referring again to FIG. 14, hydraulic lines LCH 1, LCH 2 are connected to fittings on the PDU housing and an internal "T" 150 provides a branch 152 for a "latch pressure high" supply line. Hydraulic lines UNLCH 1, UNLCH 2 are connected to the housing and another internal "T" 154 provides a branch line for "unlatch pressure high" supply 156.

The internal control system for the PDU 36 includes an electrically-actuated solenoid valve 158 and a switching control valve 160. The solenoid valve 158 is spring biased 162 into a default "disarmed" position.

Figure 15:
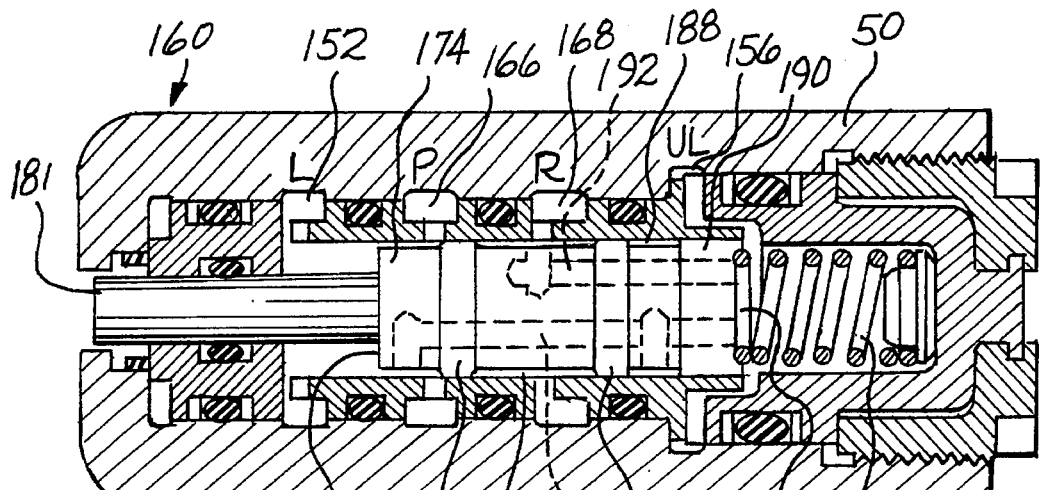
FIGS. 15–17 are longitudinal sectional views of a selector valve according to the present invention and taken substantially along line 15—15 of FIG. 6.
Figure 16:
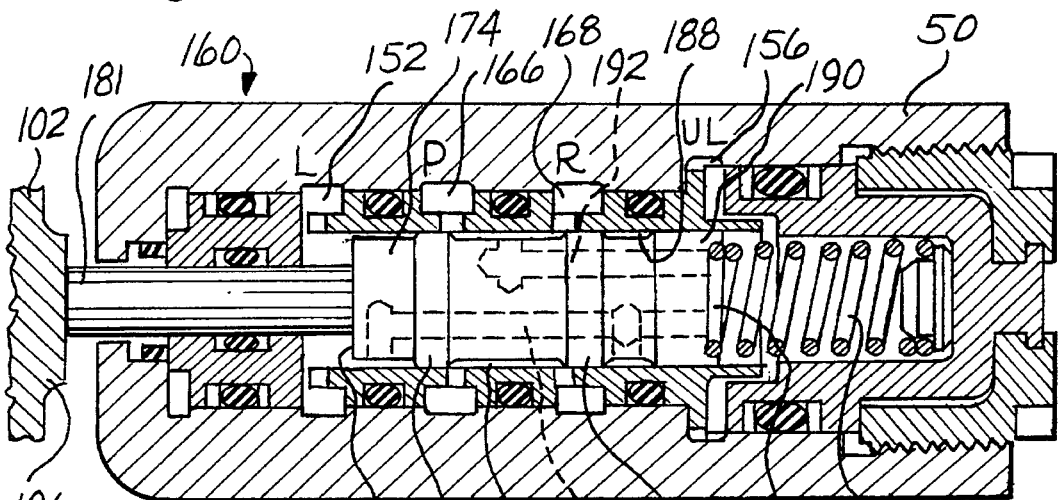
Figure 17:
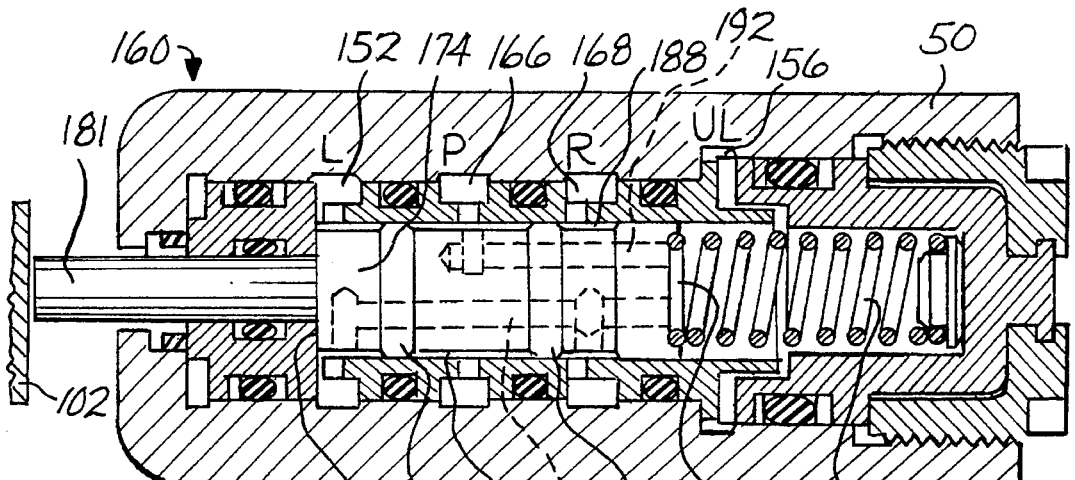

The switching control valve 160 is located in housing 50 and includes three distinct positions. In preferred form, valve 160 is a spool valve such as is shown in FIGS. 15–17. The position of the spool is controlled by hydraulic pressure at opposite ends and by a spring 164 which biases the spool toward the third position (FIG. 17).

When the solenoid valve 158 is de-energized, as illustrated in FIG. 14, equal hydraulic pressure is delivered to both the piston side chamber 74 and cylinder side chamber 76 of the cylinder 68. This is the case whether LATCH pressure is high or UNLATCH pressure is high and regardless of the position of valve 160. In this situation, the PDU 36 is "commanded" or biased toward "lock." This is due to the difference in surface area between chambers 74 and 76 in the cylinder 68. The greater surface area presented on the cylinder side of the piston head 78, as opposed to the piston rod 66 side of the piston head 78, causes the piston cylinder unit 64 to extend as illustrated in FIGS. 8 and 14, when equal pressure is applied to both sides. As previously described, this is the "lock" position. Output lines 166, 168 from the valve 160 connect to ports of the solenoid valve 158. Output line 166 may, if desired, include a flow restrictor 170 and is connected to the "piston side" chamber 74 of the cylinder 68 through conduit 70. Line 166 is also connected to the port designated "P" (representing "piston side") of the solenoid valve 158. Output line 168 includes a check valve 172 and is connected to the return port (designated "R") on the solenoid valve 158.

Referring to FIGS. 15–17, therein is shown a preferred embodiment of the switching control valve 160. The valve 160 includes a spool 174 which is biased at one end 176 by a spring 178. Extending axially from the opposite end 180 is an inhibit "dog" or rod 181, the function of which will be described later. A first groove 182 is formed between lands 184, 186. A second groove 188 is formed between lands 186, 190. An internal passageway 192 through the spool 174 connects the first end 176 with the first groove 182. A second passageway 194 connects the second end 180 with the second groove 188.

One of the safety features built into the overall folding wingtip system is that the latch pin actuators 34 are not to retract the latch pins 21 until all of the secondary locks are unlocked. An important aspect of the present invention is that the PDU 36 prevents unlocking of the secondary locks if UNLATCH is being commanded, i.e. pressure to the UNLATCH line 156 is high, prior to the PDU 36 having operated to unlock the secondary locks. In order to fully understand this safety feature, the operation sequence of the present invention will be described below.

Beginning the sequence with wingtips 12 being in a spread position, fully latched and locked, the airplane 10 may have just landed and be taxiing toward an airport gate. Through means which are no part of the present invention, the system detects that the weight of the airplane is being fully carried by its landing gear and that the airplane's taxi speed is below a predetermined limit. Hydraulic pressure "high" is commanded to the LCH lines, including supply line 152. Hydraulic pressure "low," or return, is commanded to the UNLCH lines, including supply line 156. As can be seen from a study of FIGS. 14–17, applying hydraulic pressure to line 152 and connecting line 156 to return shifts the valve 160 to a first position, compressing spring 164, 178. This position is illustrated in FIG. 15. Equal hydraulic pressure is applied through lines 70 and 72 to chambers 74 and 76 of the actuation cylinder 68. Due to the previously-described difference in surface area on opposite sides of the piston head 78, the cylinder 68 is shifted or remains biased toward the extended or "locked" position. The PDU 36 is then commanded to unlock by energizing the solenoid valve 158. This causes the force of spring 162 to be overcome and the cylinder chamber 76 to be connected to return. This connection is made through line 72, actuated solenoid valve 158, line 168, check valve 172, valve 160, and line 156. Pressure being applied through line 70 to the piston chamber 74 causes actuation of the piston cylinder unit 64, thereby driving the pinion gear 86 and, consequently, outputs 38, 40 to "unlock" in the previously-described manner. When the carrier 102 has travelled through approximately 135° of rotation, switch 148 is actuated signalling the system that all secondary locks are "unlocked" and that an "UNLATCH" command is appropriate. The "UNLATCH" command entails switching hydraulic pressure to the UNLCH lines and connecting LCH lines to return. Due to a configuration of the latch pin actuators 34 which is not a part of the present invention, primary locks are "unlocked" and latch pins 21 are retracted to an "unlatched" position. At the same time, valve 160 of the present invention senses a loss of hydraulic pressure to the second end 180 of the spool and the presence of hydraulic pressure on the first end 170, causing the spool 174 to shift to the third position, as shown in FIG. 17. This is an important feature of the present invention in that it provides an additional safety check of first requiring LCH high pressure, thereby biasing latch pins to their latch position, prior to the PDU 36 being capable of moving secondary locks to an "unlocked" position. Additionally, this feature allows the PDU 36 to remain biased toward the "unlocked" position even when hydraulic supply pressure is reversed to "UNLCH" high.

In this position, hydraulic fluid entering at port 156 is applied against the first end 176 of the spool 174 and is delivered through passageway 192 to groove 182 and into line 166. The return line 168 returns hydraulic fluid into the valve 160 to groove 188, through passageway 194 and delivers it to the second end 180 of the spool 174 to flow out port 152. As a result, the nearly instantaneous shift of valve 160 from position (1) (FIG. 15) to position (3) (FIG. 17) as a result of reversing of hydraulic pressure from line 152 to line 156, causes the cylinder 68 to remain in its actuated position (FIG. 9) and for the PDU 36 to continue to bias the secondary locks toward "unlock."

As previously described, after each latch pin 21 has been fully retracted, the secondary locks, and consequently the drive outputs 38, 40 of the PDU 36, are allowed to rotate approximately another 30° further. The second switch 146 is actuated by the cam 140 contacting the lever 142 and a "fully unlatched" condition is reported to the control system.

During the spread sequence, the above-described steps are substantially reversed. Hydraulic pressure "high" is switched from line 156 to line 152, causing valve 160 to again shift to its first position (FIG. 15) and the PDU 36 continues to bias its outputs 38, 40 toward "unlock" while the latch pins 21 are moving into a "latched" position. The PDU 36 is then commanded to "lock" by de-energizing the solenoid valve 158. Equal pressure again being applied to chambers 74 and 76 of the cylinder 68, the piston cylinder unit 64 is once again extended, driving the pinion gear 86 and, consequently, drive outputs 38, 40 toward the "locked" position.

According to another feature of the present invention, a malfunction of the overall control system can be detected by the PDU 36. Specifically, if the system commands UNLATCH before the PDU 36 has been commanded to UNLOCK, shifting of the valve 160 into the third position is inhibited, the PDU 36 is not operated to drive its outputs 38, 40, and the secondary locks remain locked. This is accomplished by an interference between the inhibit rod 181 and a cam surface 196 on the carrier 102. This is shown in FIGS. 11 and 16, and is shown schematically in FIG. 14. Cam surface 196 is appropriately positioned on the carrier 102 such that when the PDU is in the "locked" position, it provides a mechanical interference preventing shifting of the valve 160 into its third position. Instead, if UNLATCH is commanded while the PDU 36 is still in the "locked" position, the spool 174 of valve 160 will shift to a second position, shown in FIG. 16. In this second position, hydraulic fluid entering port 156 and moving through passageway 192 is delivered to both lines 166 and 168. In this condition, regardless of the position of solenoid valve 158, hydraulic pressure is either equal to both chambers 74, 76 of the cylinder 68 or the cylinder 68 is hydraulically locked. In either event, the piston/cylinder actuator 64 remains in its fully extended position and the PDU 36 remains in its "locked" position. As a result of the system failure, the folding wingtips 12 will neither unlock nor unlatch and the wingtips 12 remain spread. This calls to the attention of the flight deck or ground crew a failure in the general control system which must be corrected. This safeguard, however, results in the wingtips 12 remaining spread—a condition which may be inconvenient, but always safe.

It will be apparent to one of ordinary skill in the art that many changes and modifications can be made to the embodiment of the present invention without departing from its spirit and scope. The PDU of the present invention may have applications and uses other than that described with respect to the preferred embodiment, above. For this reason, patent protection is not to be limited by the above-described preferred embodiments, but rather by the following claim or claims, interpreted according to accepted doctrines of claim interpretation, including the doctrine of equivalents and reversal of parts.

What is claimed is:

1. A power drive unit, comprising:

a linear hydraulic piston/cylinder unit including a set of longitudinally-spaced gear teeth in the form of a rack;

a pinion gear operatively engaging and driven by the rack;

a differential driven by the pinion gear and selectively transferring drive power to two separate rotary drive outputs;

first and second hydraulic lines connected to the power drive unit;

a switching valve responsive to a reversal of hydraulic supply pressure and return in said first and second lines, said switching valve being positioned between said lines and the piston/cylinder unit to control connection of the piston/cylinder unit to pressure and return;

an inhibit dog mounted on said switching valve; and a cam operatively connected to the pinion gear and positioned to contact the inhibit dog, when the drive outputs are in an end position and the piston/cylinder unit is in a corresponding position and there is pressure in a given one of said lines, to provide mechanical interference that prevents said switching valve from moving into a position in which it supplies pressure to the piston/cylinder unit to move the piston/cylinder unit out of said corresponding position.

2. The power drive unit of claim 1, wherein the differential includes two sets of planet gears, two sun gears, and a carrier, the carrier being operatively connected to the pinion gear for rotation around an axis, the planet gears being rotatably mounted on the carrier and movable in an arcuate path around the axis, the sun gears being positioned radially inwardly of the planet gears and rotatable co-axially with the axis, each sun gear being operatively connected to drive a separate one of the drive outputs.

3. An hydraulic control system for controlling a linear hydraulic actuator of a power drive unit, which actuator includes a cylinder movable relative to a piston and a piston rod extending from the piston outwardly of the cylinder, the piston dividing the cylinder into a first and second working chamber, the surface area of the piston facing the first working chamber being greater than the surface area of the piston facing the second working chamber, the linear hydraulic actuator having an end position wherein the linear hydraulic actuator is extended, and wherein with equal pressure in both working chambers, the linear hydraulic actuator is biased in said end position, the control system comprising:

first and second pressure lines leading, respectively, to the first and second working chambers, a switching valve for switching pressure between the first and second pressure lines, the switching valve being responsive to reversal of pressure supplied to said switching valve, a protective valve having a first port connected to the first pressure line, a second port connected to the second pressure line, and a third port connected to the first working chamber, the protective valve being movable between a locked and an unlocked position, wherein in its locked position the protective valve disconnects the first pressure line from the first working chamber and connects the second pressure line to the first working chamber so that both working chambers are connected to the same pressure source, and in its unlocked position connects the first pressure line to the first working chamber and disconnects the second pressure line from the first working chamber, wherein with the protective valve in its locked position, equal pressure is delivered to both working chambers regardless of the position of the switching valve, and the linear hydraulic actuator can only be retracted from its end position with the protective valve in its unlocked position.

4. The control system of claim 3, and further including an inhibit dog on the switching valve and a cam surface positionable by the linear hydraulic actuator to engage the inhibit dog and hold the switching valve in a first position when the linear hydraulic actuator is in said end position, thereby preventing pressure to the switching valve from moving the switching valve from its first position, wherein said switching valve has a second position, whereby, in order to move the linear hydraulic actuator from its end position, the protective valve is moved to its unlocked position and pressure is supplied to the first pressure line with the second pressure line connected to return, and the switching valve, in its first position, switches pressure to the second pressure line, which delivers pressure to the second working chamber and connects the first working chamber to return, thereby moving the linear hydraulic actuator from its end position.

* * * * *